Patented June 3, 1952

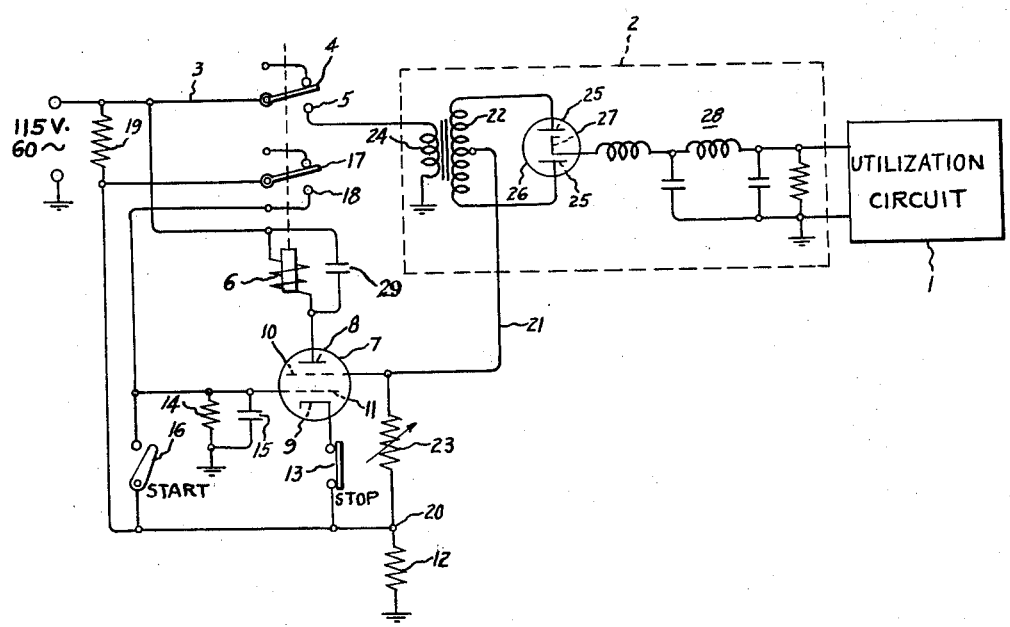

2,599,228

UNITED STATES PATENT OFFICE 2,599,228

ELECTRONIC CONTROL CIRCUIT

Robert W. Brown, North Syracuse, N. Y., assignor to General Electric Company, a corporation of New York Application December 6, 1950, Serial No. 199,507

2 Claims. (Cl. 175—294)

1

This invention relates to electronic control circuits and particularly to the type providing protection of electrical circuits against possible overload.

Prior art devices for protecting electrical circuits against overload have been relatively complex in construction and expensive. In accordance with the invention, these difficulties are resolved through the use of a simple electronic circuit controlling a single on-off relay. This arrangement results in a very sensitive overload protective device which is sufficiently rugged to insure satisfactory operation despite shock and vibration. In addition the electronic circuit can be readily adjusted to accommodate high as well as low current consuming loads while maintaining its high sensitivity of operation.

Accordingly, it is an object of my invention to provide an improved electronic control circuit.

Another object of my invention is to provide a sensitive control circuit which will lock out an overloaded circuit.

Another object of my invention is to provide a highly sensitive overload protection apparatus.

Another object of my invention is to provide an improved overload protective apparatus for accommodating both low and high current consuming load circuits.

Another object of my invention is to provide a control circuit which is highly sensitive to changes in electrical signals of both high and low intensity.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawing illustrating in circuit diagram form an embodiment of my invention.

Referring to the drawing there is shown a utilization circuit 1 connected to the output of a full-wave rectifier 2. Rectifier 2 in turn is connected to a power supply, conventionally represented as a 110 volts, 60 cycle source, by means of a ground connection and the lead 3. In lead 3 there is serially inserted a pair of normally open contactors 4 and 5. The purpose of the associated control circuitry to be described shortly is to affect closure of contacts 4 and 5 thereby permitting energization of the utilization circuit 1 from the alternating potential source and in the event that predetermined operating conditions are not encountered at any time thereafter to open the contacts 4 and 5 thereby de-energizing the utilization circuit 1.

An overload protective system of this type finds many possible applications. For instance in the event the utilization circuit 1 comprises an oscillator, any instability in the oscillator circuit will result in having the oscillator disconnected from the power supply. It should be clearly understood, however, that the invention is not restricted to this specific application and many other types of operating conditions may be established as the determining factor by providing suitable measuring and indicating devices to respond to these conditions. For instance such conditions might be excessively high voltage, excessive current frequency deviations or any combinations of these and similar factors.

Referring to the embodiment illustrated in the drawing there is shown a relay winding 6 associated with the contactors 4 and 5. In order to control energization of the winding a gaseous discharge device 7 is provided. Device 7 comprises an anode 8, a cathode 9, a screen grid 10, and a control grid 11. The gaseous discharge path of device 7 is energized from the 110 volt source through winding 6 connected between the anode 8 and one terminal of the alternating potential source, and through resistor 12 connecting the cathode 9 via the ground connection to the other terminal of the alternating potential source. Between the cathode 9 and resistor 12 there is inserted a normally closed stop switch 13. Resistor 14 and condenser 15 provide a ground return for the control grid 11. A momentary start switch 16 is provided to connect the control electrode 11 to the cathode 9 through the normally closed switch 13. A pair of contactors 17 and 18 provide a lock-in circuit around the momentary start switch 16. Resistor 19 connected between lead 3 and junction 20 provides a control bias for the cathode 9 by dividing the 110 volts between resistor 19 and resistor 12. Operating potential for the screen grid 10 is obtained by connection 21 to the center tap of secondary transformer winding 22 and series connected resistors 23 and 12 connected between the screen grid 10 and ground. The rectifier circuit 2 is conventional and comprises a primary transformer winding 24 for energizing the secondary center tapped winding 22. The end terminals of the secondary winding 22 are connected to respective anodes 25 of a dual diode rectifier tube 26. The resulting unidirectional potential developed at the cathode 27 is filtered in the circuit 28 before application to the utilization circuit 1.

The switch and contactor positions shown in the drawing correspond to the condition when the load circuit 1 is unenergized.

It should be noted that the circuit arrangement disclosed provides energization of the gaseous discharge path of device 7 through the load resistor 12 and the relay winding 6. The use of a gaseous discharge device in the manner disclosed provides a desired switching action in that the resistance between cathode and anode is high enough to be considered an open circuit as long as the control electrode 11 is negative with respect to the cathode. However, if the voltage at the control electrode 11 is made positive enough to ionize the gas in the device 7, the resistance between cathode and anode becomes so low as to be negligible in many circuits and will stay that way regardless of what potential is applied to the control electrode. This is the condition of conduction of a thyratron and it continues to conduct a relatively high current until the anode and control electrode are brought to within a few volts of each other. The point at which the gaseous discharge device 7 conducts originally can be varied to a certain degree by the amount of negative potential placed on the shield grid 10. With the control electrode 11 and cathode 9 tied together, as is contemplated in the arrangement of the drawing, and the shield grid 10 maintained at a fixed potential, device 7 conducts whenever a sufficiently high positive voltage is supplied to the anode 8 and continues to fire until the anode potential is lowered to within a few volts of the control grid 11. Once the device 7 conducts it cannot be extinguished in any other way.

If for some reason the shield grid 10 is supplied with a given negative voltage with respect to the cathode, the potential at the anode 8 must be higher than previously mentioned in order that the device 7 may conduct. When the rectifier 2 is energized, all of the current drawn by the utilization circuit passes through resistors 23 and 12 to ground thereby developing a negative potential between the shield grid 11 and the cathode 9. By varying the value of resistor 23, any desired potential difference may be established between the shield grid and the cathode. Actually, the gaseous discharge device 7 requires only a very small change in the current drawn by the utilization circuit 1 to provide the small voltage differences required between the shield grid and the cathode to provide the protective action desired.

The alternating potential bias applied by the voltage divider action of resistors 19 and 12 to the cathode 9, insures that the gaseous discharge device 7 will not conduct unless the grid 11 is connected to it. For a given applied cathode to anode potential, a given negative potential applied between cathode 9 and shield grid 10 will keep the device 7 from conducting during any portion of the positive going cycle of the alternating potential applied to the anode 8. To energize the utilization circuit, the start switch 16 is momentarily closed and since no negative potential is applied between cathode 9 and the shield grid 10 due to the normally open contacts 4 and 5, device 7 conducts on the next positive going cycle of alternating potential applied to anode 8. The resulting electron discharge current flow through the winding 6 causes contactors 4 and 5 to close thereby applying alternating potential over lead 3 to the rectifier circuit 2. Circuit 2 in turn energizes the utilization circuit 1. Assuming normal operation of the utilization circuit, the resultant load current flow through the resistors 23 and 12 develops a potential difference between the shield grid 10 and the cathode 9 of a magnitude slightly greater than that required to prevent subsequent conduction of the device 7. In addition, due to current flow in winding 6, contactors 17 and 18 are closed thereby short-circuiting the momentary start switch 16. This connects the control grid 11 to the cathode 9, thereby permitting continued conduction of the gaseous discharge device. To insure that the winding 6 remains energized during the negative going portions of the alternating potential applied to the anode 8, condenser 29 is connected across the winding. Thus the energy stored in the condenser 29 during the positive going portions of the applied anode potential discharges through the winding 6 during the negative going portions to maintain current flow therein and insure that contactors 4, 5 and 17, 18 are maintained closed.

In the event the utilization circuit overloads the rectifier 2, the resultant increase in current flow through resistor 23 correspondingly increases the negative potential between the shield grid 10 and the cathode 9. The winding 6 remains energized for the balance of the positive cycle of anode potential, but device 7 will not conduct on the succeeding positive cycle due to the increased potential between the screen grid and cathode. The contactors 4, 5 and 17, 18 open when the discharge current from the condenser 29 drops below a given level. This immediately de-energizes the utilization circuit 1 and opens the grid to cathode circuit of tube 7. In order to re-energize the load circuit, the start button 16 must be pressed again to initiate the previously mentioned series of operations. If at any time it is desired to de-energize the load circuit, the stop button may be momentarily opened thereby interrupting gaseous discharge current flow through the winding 6 and permitting the contactors 4, 5 and 17, 18 to open.

The sensitivity of the control circuit of the present invention may be best appreciated by considering a practical embodiment in which 115 volts alternating potential was applied to the anode 8 as shown in the drawing. An alternating potential bias of 3.4 volts was developed across resistors 19 and 12 at the cathode 9. This set of voltage conditions required 1.05 volts of negative potential difference between the shield grid 10 and the cathode 9 to keep the thyratron from conducting. In this particular instance, the utilization circuit 1 consumed 100 milliamperes of current from the rectifier circuit 2. Accordingly, a resistor of 100 ohms was employed for 23, developing a negative 1 volt of potential across it. As long as the current consumed by the utilization circuit stayed below 105 milliamperes, the utilization circuit 1 was maintained energized. However, as soon as the current drawn by circuit 1 thru resistor 23 reached 105 milliamps, the device 7 was prevented from conducting, thereby disconnecting the utilization circuit 1 from the power supply.

The simple manner in which the bias for the screen grid 10 is obtained permits ready application of the circuit to accommodate high as well as low current consuming circuits while maintaining a high degree of sensitivity.

While a specific embodiment has been shown

What I claim as new and desire to secure by Letters Patent of the United States is:

1. An overload protective apparatus for a load circuit comprising a two terminal source of alternating potential, a gaseous discharge device including an anode, a cathode, a control grid and a shield grid, a relay including an operating winding and a pair of normally open contacts for connecting said circuit to said source, said winding connecting said anode to one terminal of said source, said load circuit including a first and a second resistance connected in series between said shield grid and said other terminal, a third resistance connected between the junction of said first and second resistances and said one terminal, means connecting said cathode to the junction of said resistances, means connecting said control electrode to said other terminal, a normally open switch connected between said control grid and cathode, the alternating potential bias developed across said second resistor between said cathode and said other terminal normally maintaining said device non-conductive during positive excursions of the alternating potential applied between said anode and said cathode, and another pair of normally open contacts included in said relay and paralleled with said switch to maintain conduction in said device during positive excursions of the alternating potential applied between said anode and said cathode, said device being responsive to a change in shield grid-to-cathode potential resulting from current flow in said resistances above a given amplitude for rendering said device non-conductive.

2. A control system for selectively conditioning an energizing circuit for a utilization device comprising a gaseous discharge device including an anode, a cathode and a pair of control electrodes, a source of alternating potential having one terminal coupled to said anode and another terminal coupled to one of said control electrodes, a voltage-dividing impedance including end portions connected to said terminals of said source and a portion intermediate said end portions connected to said cathode for providing a bias potential between said cathode and said one control electrode of a magnitude sufficient to prevent conduction in said device, another impedance included in series relation with said energizing circuit and coupled to said cathode and to the remaining one of said control electrodes to provide another bias potential for controlling conduction in said device in response to the amount of current flow in said energizing circuit, a relay device having a pair of electrical contacts in series relation with said energizing circuit and a contact-actuating winding included in the anode-cathode current path of said device responsive to a change in current flow in said path for actuating said contacts, and means for reducing said first-mentioned bias potential to initiate conduction in said device.

ROBERT W. BROWN.

REFERENCES CITED

The following references are of record in the file of this patent:

UNITED STATES PATENTS

| Number | Name | Date |
|---|---|---|
| 2,412,092 | Mayle | Dec. 3, 1946 |
| 2,462,799 | Young et al. | Feb. 22, 1949 |
| 2,473,344 | McCown | June 14, 1949 |
| 2,548,818 | Rambo | Apr. 10, 1951 |